(No Model.)

W. H. ROUNDY & D. LENNOX.
Machine for Grinding Mower and Harvester Knives.
No. 242,794. Patented June 14, 1881.

WITNESSES:
C. Bendixon
Wm. C. Raymond

INVENTORS:
William H. Roundy & David Lennox
per Duell, Laass & Hy
attorneys.

N. PETERS, Photo-Lithographer, Washington, D. C.

UNITED STATES PATENT OFFICE.

WILLIAM H. ROUNDY AND DAVID LENNOX, OF MARSHALLTOWN, IOWA.

MACHINE FOR GRINDING MOWER AND HARVESTER KNIVES.

SPECIFICATION forming part of Letters Patent No. 242,794, dated June 14, 1881.

Application filed January 20, 1881. (No model.)

*To all whom it may concern:*

Be it known that we, WILLIAM H. ROUNDY and DAVID LENNOX, of Marshalltown, in the county of Marshall, in the State of Iowa, have invented new and useful Improvements in Machines for Grinding Mower and Harvester Knives, of which the following, taken in connection with the accompanying drawings, is a full, clear, and exact description.

The nature of this invention consists, chiefly, in certain novel means of imparting to the emery-wheel, automatically with its rotary motion, the reciprocal motion requisite for passing said wheel along the V-shaped cutting-edges of a mowing and reaping machine knife; and it also consists in a simple and effective device for regulating the amount of friction of the emery-wheel upon the work to be ground or polished, all as hereinafter fully described.

Figure 1:
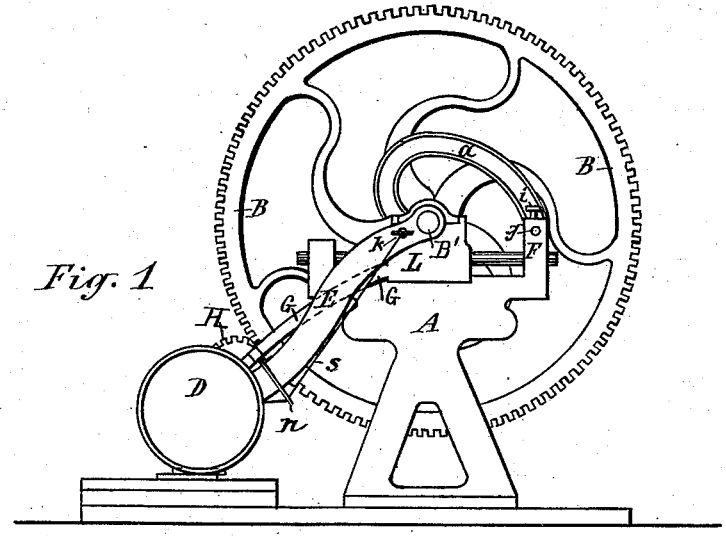
Figure 2:
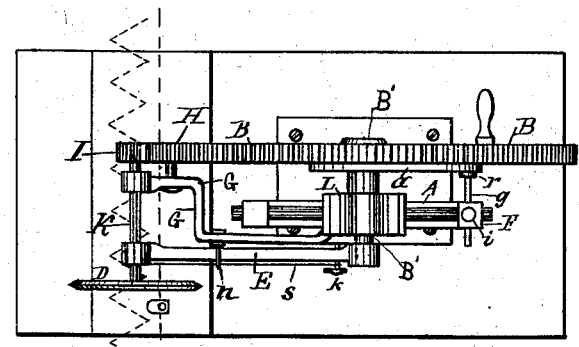
Figure 3:
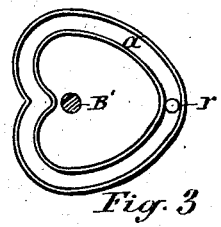

In the accompanying drawings, Figure 1 is a side elevation of my invention; Fig. 2, a plan view of same; and Fig. 3 is a detached view of the cam which imparts the reciprocal motion to the emery-wheel.

Similar letters of reference indicate corresponding parts.

A represents a pillow-block or pedestal, provided on top with a horizontal guideway, on which is fitted to slide a journal box or bearings, L, in which is mounted the shaft B' of the driving-wheel B.

D denotes the emery-wheel, designed to grind or polish mower and harvester knives which are placed upon a suitable bed under the wheel D. The arbor K of the wheel D is carried at the end farthest from said wheel by an arm, G, which is rigidly attached to or integral with the sliding journal-box L, at the side opposite that at which the driving-wheel of the machine is located, said arm being properly curved or bent to bring its free end in the requisite position for carrying the arbor, as aforesaid. By means of a pinion, I, on the arbor K, and an intermediate gear, H, journaled on the arm G, rotary motion is transmitted from the driving-wheel B to the abrading-wheel D. That end of the arbor K to which the wheel D is attached is carried by an arm, E, loosely connected with the shaft B' of the driving-wheel, and having in its opposite end a suitable bearing for the arbor K, thus allowing the aforesaid end of the arbor to vibrate up and down.

$n$ represents a stirrup, rigidly secured to the arm G and extending down by the side of the arm E and some distance below the same. From the end of the vibratory arm E which carries one end of the arbor K, as before described, is extended a cord, $s$, which passes under the lower end of the stirrup $n$, and is at the opposite end attached to and wound upon a set-screw, $k$, inserted in the arm E, near its connection with the shaft B'. By turning the set-screw $k$ so as to wind up the cord $s$, the latter, by being drawn under the lower end of the stirrup $n$, is caused to draw the opposite or lower end of the vibratory arm E downward. This carrying with it that end of the arbor to which the emery-wheel is attached causes said wheel to be applied with increased pressure against the knives to be operated on. Thus it will be observed that the machine is rendered perfectly adjustable with reference to the degree of friction desired of the wheel D upon its work.

$a$ represents a cam, in the form of a grooved curvilinear plate, fixed to or cast on the side of the driving-wheel B, and arranged eccentric to the axis thereof. Through a standard, F, on the pedestal A, passes a pin or stud, $g$, having on its end a roller, $r$, of proper size to enter the groove of the cam $a$. The stud $g$ is made adjustable in the standard F, so as to allow the roller to be either introduced into or withdrawn from the groove of the cam, as may be desired. By means of a set-screw, $i$, inserted through the standard F and bearing on the stud $g$, the roller is secured in its desired position. By the engagement of the roller $r$ with the cam $a$ the wheel B, when rotated, is forced to slide bodily backward and forward on the guideway at the top of the pedestal A, and this reciprocating motion is transmitted to the emery-wheel D by the arms E and G before described, thus imparting to said wheel automatically with its rotation the requisite movement for following the V-shaped cutting-edges of the knives passed under it in the process of grinding. When the wheel D is to be employed simply for grinding or other work not requiring the reciprocal movement the roller $r$ is withdrawn from the cam $a$.

We do not confine ourselves to any particular form of the cam which imparts the reciprocating movement to the machine, as it is obvious that various forms will accomplish the result sought to be attained by our invention.

Having described our invention, what we claim is—

1. In a machine for grinding mower and harvester knives, the combination of an abrading-wheel carried by an arm connected with the shaft of a wheel which is mounted in movable bearings on a stationary pillow-block or pedestal, a cam fixed to said wheel, and a stud fixed to the pillow-block and movably engaged with the cam, substantially as set forth and shown.

2. In combination with the wheel B, having its axial bearings mounted movably on the pedestal A, and connected with the wheel D by the arm E, in the manner shown, the cam $a$, fixed to the wheel B, and the stud $g$, adjustably secured to the pedestal by the set-screw $i$, and provided with the friction-roller $r$, substantially in the manner shown and set forth.

3. The arbor K, provided with the abrading-wheel D, and gear I, in combination with the arm G, rigidly attached to the sliding box L, the vibratory arm E, stirrup $n$, cord $s$, and set-screw $k$, substantially as and for the purpose set forth.

In testimony whereof we have hereunto signed our names and affixed our seals, in the presence of two attesting witnesses, at Marshalltown, in the county of Marshall, in the State of Iowa, this 12th day of January, 1881.

WILLIAM H. ROUNDY. [L. S.]
DAVID LENNOX. [L. S.]

Witnesses:
B. C. CLARK,
GLENN R. CLARK.